Patented Oct. 18, 1949

2,485,095

UNITED STATES PATENT OFFICE 2,485,095

INSECTICIDES

Walter D. Harris, Naugatuck, and Herman D. Tate, Woodbridge, Conn., assignors to United States Rubber Company, New York, N. Y., a corporation of New Jersey No Drawing. Application April 26, 1947, Serial No. 744,158

13 Claims. (Cl. 167—30)

This invention relates to improvements in insecticides, and particularly to acaricides for controlling mites.

Organic chemicals are widely used to control insects. However, one group, the mites, of the species Acarida, remain as troublesome pests which are not satisfactorily controlled by commercially available insecticides.

We have found that beta-monohaloethyl esters of monohalogenated benzenesulfonic acids are powerful acaricides. These are new chemicals which we have found to be toxic to a variety of insects, and particularly to mites. The esters of the present invention may be readily prepared from ethylene halohydrin and an acid halide of the selected monohalogenated benzenesulfonic acid. The reaction may be carried out conveniently by refluxing a mixture of the two reagents, with or without the use of an inert solvent such as benzene, xylene, tetrachloroethane or the like, until the desired conversion has taken place. The reaction may also be carried out by adding alkali to a mixture of the reagents.

The beta-haloethyl esters of monohalogenated benzenesulfonic acids may be applied to loci to be protected against insects in undiluted form, or as dust when admixed with or adsorbed on powdered solid carriers, such as the various mineral silicates, e. g. mica, talc, pyrophyllite and clays, or as liquids or sprays when in a liquid carrier, as in solution in a suitable solvent, or dispersed in a suitable non-solvent medium, for example, water. In protecting plants (the term including plant parts) which are subject to attack by insects, the chemicals of the present invention are preferably applied as aqueous emulsions containing a dispersing agent. The chemicals of the present invention may be applied to loci to be protected against insects by the aerosol method. Solutions for the aerosol treatment may be prepared by dissolving the chemical directly in the highly volatile liquid carrier or first dissolving the chemical in a less volatile solvent and then admixing such solution with the highly volatile liquid aerosol carrier. The chemicals may be used admixed with carriers that are active of themselves, for example, other insecticides, fungicides or bactericides. The chemicals may also be used as intermediates in organic synthesis.

Detailed procedures for the preparation of various compounds of the present invention are described in Examples I to IV below.

EXAMPLE I

*Beta-chloroethyl para-chlorobenzenesulfonate*

A solution of 50 parts by weight of para-chlorobenzenesulfonyl chloride and 50 parts by weight of ethylene chlorohydrin was heated under reflux for five hours. The excess ethylene chlorohydrin was distilled under reduced pressure and the residue was washed with water to remove any free acid. The washed material was distilled yielding 45 parts by weight (74% of theoretical based on acid chloride) of

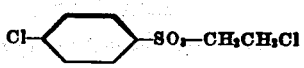

The compound was a colorless oil which boiled at 200° C./15 mm. Refractive index $n_D^{20}$ 1.5458. Analysis calculated for $C_8H_8O_3SCl_2$, 27.84% Cl; found, 27.75% Cl.

The reaction involved may be represented by the equation

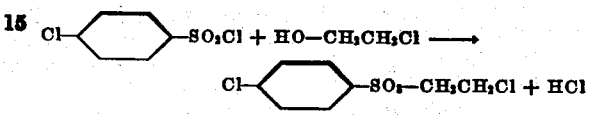

EXAMPLE II

*Beta-chloroethyl meta-chlorobenzenesulfonate*

A mixture of 15 parts by weight of meta-chlorobenzenesulfonyl chloride and 12 parts by weight of ethylene chlorhydrin was cooled to 5° C. and stirred as 23 parts by weight of 6 normal sodium hydroxide was added with continued cooling at such a rate that the temperature was maintained at 8–16° C. Stirring was continued at this temperature for four hours. The mixture was extracted with ether, and the ether solution was washed with water. The ether solution was dried over anhydrous sodium sulfate, and the solvent was then distilled off. The residual oil was distilled under reduced pressure, yielding 13.5 parts by weight of

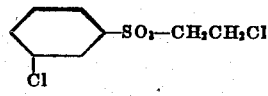

The compound was a water-white oil which boiled at 138–141° C/1 mm. Refractive index $n_D^{20}$ 1.5438. Analysis calculated for $C_8H_8O_3SCl_2$, 27.84% Cl.; found, 27.70% Cl.

EXAMPLE III

*Beta-bromoethyl para-chlorobenzenesulfonate*

One mole of para-chlorobenzene sulfonyl chloride and one and one-half moles of ethylene bromohydrin were mixed and the mixture cooled to 5° C. With stirring and continued cooling 2 moles of NaOH (6 normal) were added from a dropping funnel at such a rate that the temperature of the mixture was kept between 8 and 16° C. The reaction mixture was stirred at this temperature for 4 hours. The mixture was extracted with ether, and the ether solution was washed with water. The ether solution was dried over anhydrous sodium sulfate, and the solvent was then distilled off. The residual oil was distilled under vacuum giving a 60% yield of

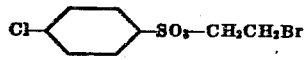

The compound was a colorless oil which boiled at 140–145° C./0.5 mm. Refractive index $n_D^{20}$ 1.5638. Analysis calculated for $C_8H_8O_3SClBr$, 10.68% S; found, 11.1% S.

EXAMPLE IV

*Beta-chloroethyl para-bromobenzenesulfonate*

This compound was prepared by the method described in Example I from 25.5 parts by weight of para-bromobenzenesulfonyl chloride and 24 parts by weight of ethylene chlorohydrin. The

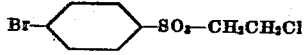

product was a straw-colored oil boiling at 135–140° C./0.3 mm. Refractive index $n_D^{20}$ 1.5618. Analysis calculated for $C_8H_8O_3SClBr$, 10.68% S; found, 10.66% S.

EXAMPLE V

*Beta-chloroethyl para-fluorobenzenesulfonate*

This compound was prepared as in Example I by refluxing 10 parts by weight of para-fluorobenzenesulfonyl chloride with 10 parts by weight of ethylene chlorohydrin. 7.5 parts by weight of

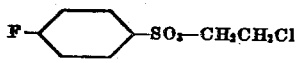

were recovered. The product was a light yellow oil which boiled at 115–120° C./0.3 mm. Refractive index $n_D^{20}$ 1.5122. Analysis calculated for $C_8H_8O_3SClF$, 13.48% S; found, 13.41% S.

The following Examples VI to XI illustrate the effectiveness of the chemicals of the invention for controlling mites:

EXAMPLE VI

One and one half parts by weight of a commercial dispersing agent Emulfor EL, which is a reaction product of ethylene oxide and castor oil known to be non-toxic to the organisms under test, were dissolved in 100 parts by weight of beta-chloroethyl para-chlorobenzenesulfonate. Portions of this solution were then stirred with the required amount of water to give aqueous emulsions of the beta-chloroethyl para-chlorobenzenesulfonate of concentrations of 1:100, 1:400, 1:1600 and 1:3200. A ring of an adhesive preparation non-toxic to the organisms under test which is used on fly papers and for ringing trees, was placed around the borders of the upper surfaces of the leaves of growing Pinto bean plants which were at the two leaf stage. Red spider mites (*Tetranychus telarius*) were transferred to the thus treated leaves by placing infested bean leaves within the border of the adhesive preparation for twenty-four hours. The plants thus infested were then sprayed with the aqueous emulsions of beta-chloroethyl para-chlorobenzenesulfonate. Observations were made after twenty-four hours to determine the kill of mites. A 99.1% kill was obtained at a concentration of 1:100, a 100% kill at a concentration of 1:400, a 95% kill at a concentration of 1:1600, and a 68.5% kill at a concentration of 1:3200 of the beta-chloroethyl para-chlorobenzenesulfonate.

EXAMPLE VII

Aqueous emulsions of beta-chloroethyl para-chlorobenzenesulfonate and of beta-chloroethyl meta-chlorobenzenesulfonate and of beta-bromoethyl para-chlorobenzenesulfonate were prepared by mixing solutions of 1 part by weight of Emulfor EL in 10 parts by weight of the chemical with enough water to give aqueous emulsions of the chemicals at concentrations of 1:400, 1:800 and 1:1600. Using the testing technique described in Example VI, 100% kills of the mites were obtained in 24 hours with the various concentrations of beta-chloroethyl para-chlorobenzenesulfonate, of beta-chloroethyl meta-chlorobenzenesulfonate, and of beta-bromoethyl para-chlorobenzenesulfonate.

EXAMPLE VIII

Aqueous emulsions of beta-chloroethyl parafluorobenzenesulfonate were prepared by mixing a solution of 1 part by weight of Emulfor EL in 10 parts by weight of beta-chloroethyl para-fluorobenzenesulfonate with enough water to give concentrations of the beta-chloroethyl para-fluobenzenesulfonate of 1:400 and 1:800. Pinto bean leaves infested with red spider mites (*Tetranychus telarius*) were sprayed with said aqueous emulsions. The leaves were then placed in separate covered petri dishes. Observations were made after twenty-four hours to determine the kill of mites. Kills of 100% and 79.6% were obtained at concentrations of 1:400 and 1:800 respectively of the beta-chloroethyl para-fluorobenzenesulfonate.

EXAMPLE IX

Using the same testing technique as in Example VIII, a kill of 86.5% of the mites was obtained in 24 hours at a 1:400 concentration of beta-chloroethyl parabromobenzenesulfonate.

The following Examples X and XI illustrate the effectiveness of the chemicals of the invention for controlling other insects.

EXAMPLE X

Pinto bean leaves were sprayed with a 1% aqueous emulsion of beta-chloroethyl para-chlorobenzenesulfonate containing a small amount of dispersing agent Emulfor EL which is known to be non-toxic to the organisms under test. Four replicates of the thus treated leaves and four replicates of untreated leaves were infested with approximately 40 Mexican bean beetles (*Epilachna varivestis*). The leaves were then placed in separate covered petri dishes. After 48 hours, observations disclosed an average of 55.2% mortality on the leaves treated with the beta-chloroethyl para-chlorobenzenesulfonate, and no mortality of beetles on the untreated leaves.

EXAMPLE XI

Leaves of the broad bean (*Vicia fabia*) infested with pea aphids (*Macrosiphum pisi*) were sprayed with a 1% aqueous emulsion of beta-chloroethyl para-chlorobenzenesulfonate containing a small amount of dispersing agent Emulfor EL which is known to be non-toxic to the organisms under test. There were a variable number of insects from 31 to 61 in each of four replicates of the sprayed leaves. There were also a variable number of insects from 79 to 120 in each of four replicates of aphid-infested leaves not sprayed with the chemical. The leaves were placed in separate covered petri dishes. Observations were made after 24 hours to disclose the kill of aphids. The average kill of aphids on leaves treated with the beta-chloroethyl para-chlorobenzenesulfonate was 55.8%. The average mortality on the untreated leaves was 4.1%.

The extreme importance of the two halogen atoms in the chemicals of the present invention, and their positions, is attested to by the relative inactivity as acaricides of very closely related compounds. For example, as compared to the 100% kill of mites in Example VI at concentrations of 1:400, 1:800 and 1:1600 of beta-chloroethyl para-chlorobenzenesulfonate and of beta-chloroethyl meta-chlorobenzenesulfonate, tests made as in Example VIII with closely related compounds, prepared by reaction of the appropriate alkylene chlorhydrin or alkylene cyanhydrin with the appropriate benzene sulfonyl chloride gave very little if any appreciable control of red spider mites, as shown below:

Beta-chloroethyl benzenesulfonate

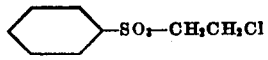

gave only 10.6% kill of mites at 1:400 concentration.

Ethyl para-chlorobenzenesulfonate

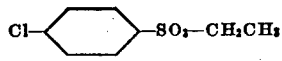

gave only 4.6% kill of mites at 1:400 concentration.

Gamma-chloropropyl para-chlorobenzenesulfonate

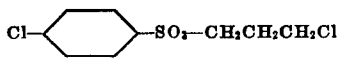

gave only 10.7% kill of mites at 1:400 concentration.

Beta, beta-dichloroisopropyl para-chlorobenzenesulfonate

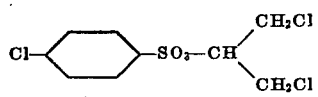

gave only 10% kill of mites at 1:100 concentration.

Beta, gamma-dichloropropyl para-chlorobenzenesulfonate

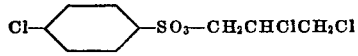

gave only 17% kill of mites at 1:100 concentration.

Beta, beta, beta-trichloroethyl para-chlorobenezensulfonate

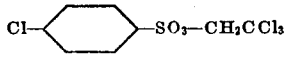

gave only 14% kill of mites at 1:100 concentration.

Beta-cyanoethyl para-chlorobenzenesulfonate

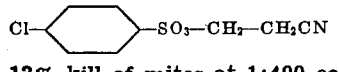

gave only 13% kill of mites at 1:400 concentration.

Beta-chloroethyl 3,4-dichlorobenzenesulfonate

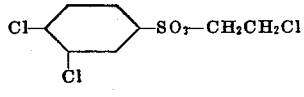

gave only 17.9% kill of mites at 1:100 concentration.

Beta-chloroethyl 2,5-dichlorobenzenesulfonate

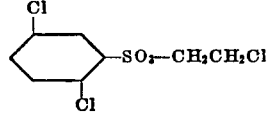

gave only 11% kill of mites at 1:400 concentration.

Having thus described our invention, what we claim and desire to protect by Letters Patent is:

1. A beta-monohaloethyl ester of a monohalogenated benzenesulfonic acid selected from the group consisting of beta-chloroethyl esters and beta-bromoethyl esters of meta- and para- chlorobenzene and meta- and para- bromobenzene and meta- and para- fluobenzene sulfonic acids.

2. Beta - chloroethyl para - chlorobenzenesulfonate.

3. Beta - chloroethyl meta - chlorobenzenesulfonate.

4. Beta - bromoethyl para - chlorobenzenesulfonate.

5. An insecticidal composition comprising a beta-monohaloethyl ester of a monohalogenated benzenesulfonic acid selected from the group consisting of beta-chloroethyl esters and beta-bromoethyl esters of meta- and para- chlorobenzene and meta- and para- bromobenzene and meta- and para- fluobenzene sulfonic acids, and a carrier therefor.

6. An insecticidal composition comprising a beta-monohaloethyl ester of a monohalogenated benzenesulfonic acid selected from the group consisting of beta-chloroethyl esters and beta-bromoethyl esters of meta- and para- chlorobenzene and meta- and para- bromobenzene and meta- and para- fluobenzene sulfonic acids, and a liquid carrier therefor.

7. An insecticidal composition comprising a beta-monohaloethyl ester of a monohalogenated benzenesulfonic acid selected from the group consisting of beta-chloroethyl esters and beta-bromoethyl esters of meta- and para- chlorobenzene and meta- and para- bromobenzene and meta- and para- fluobenzene sulfonic acids, and a powdered solid carrier therefor.

8. An insecticidal composition comprising a beta-monohaloethyl ester of a monohalogenated benzenesulfonic acid selected from the group consisting of beta-chloroethyl esters and beta-bromoethyl esters of meta- and para- chlorobenzene and meta- and para- bromobenzene and meta- and para- fluobenzene sulfonic acids, and a powdered mineral silicate.

9. An insecticidal composition comprising an aqueous emulsion of a beta-monohaloethyl ester of a monohalogenated benzenesulfonic acid selected from the group consisting of beta-chloroethyl esters and beta-bromoethyl esters of meta- and para- chlorobenzene and meta- and para- bromobenzene and meta- and para- fluobenzene sulfonic acids, said aqueous emulsion containing a dispersing agent.

10. An insecticidal composition comprising beta-chloroethyl para-chlorobenzenesulfonate, and a powdered mineral silicate.

11. An insecticidal composition comprising an aqueous emulsion of beta-chloroethyl para-chlorobenzenesulfonate, said aqueous emulsion containing a dispersing agent.

12. An insecticidal composition comprising beta-chloroethyl meta-chlorobenzenesulfonate, and a powdered mineral silicate.

13. An insecticidal composition comprising an aqueous emulsion of beta-chloroethyl meta-chlorobenzenesulfonate, said aqueous emulsion containing a dispersing agent.

WALTER D. HARRIS.
HERMAN D. TATE.

(References on following page)

REFERENCES CITED

The following references are of record in the file of this patent:

UNITED STATES PATENTS

| Number | Name | Date |
|---|---|---|
| 2,148,928 | De Meuron | Feb. 28, 1939 |

FOREIGN PATENTS

| Number | Country | Date |
|---|---|---|
| 353,195 | Germany | May 12, 1922 |

OTHER REFERENCES

Krafft et al., "Ber. deutsch. chem. Ges.," vol. 25 (1892), pages 2260-2261.

Winstein et al., "J. Am. Chem. Soc.," vol. 68 (No. 3, March 26, 1946), page 536.